United States Patent [19]

Balder et al.

[11] Patent Number: 4,497,278
[45] Date of Patent: Feb. 5, 1985

[54] PORTABLE BIRD PERCH ASSEMBLY

[76] Inventors: Richard T. Balder, 4420½ Sepulveda, Sherman Oaks, Calif. 91403; Michael P. Knutsen, 3833 Sawtelle Blvd., Los Angeles, Calif. 90066

[21] Appl. No.: 619,779

[22] Filed: Jun. 11, 1984

[51] Int. Cl.³ .............................................. A01K 31/12
[52] U.S. Cl. ............................................................ 119/26
[58] Field of Search .................................... 119/26, 103

[56] References Cited

U.S. PATENT DOCUMENTS

| | | | |
|---|---|---|---|
| 910,298 | 1/1909 | Lindemann | 119/26 |
| 1,575,101 | 3/1926 | Edwards | 119/26 |
| 2,707,936 | 5/1955 | Kiehl | 119/26 |
| 3,119,372 | 1/1964 | Gantz | 119/26 X |
| 3,266,464 | 8/1966 | Davis | 119/103 |
| 3,810,445 | 5/1974 | Stadler | 119/26 |

*Primary Examiner*—Hugh R. Chamblee
*Attorney, Agent, or Firm*—John J. Posta, Jr.

[57] ABSTRACT

An improved portable bird perch assembly adapted to be mounted on a golf cart or the like is provided. The assembly includes an upraised support arm, an anchoring base and a bird perch arm secured to the support arm and rotatable between an operative horizontal perch position and a folded storage position adjacent the support arm. The perch arm may have a roughened irregular surface or covering of wood or the like which may be replaceable. The covering can include a portion having embedded seedy gravel or the like. The perch arm can be hollow and include a storage space for part of the support arm. It can also include integral grain feed and water bins openable at the top, or the perch arm can receive a removable separate feeder. The perch arm can also include a score card holder. The support arm can be telescopable, can be releasably secured to the base and can include shock absorbing means. The base can comprise a C-clamp with removable gripping teeth and an optional bracket releasably secured to the clamp. The device is simple, efficient and inexpensive.

20 Claims, 5 Drawing Figures

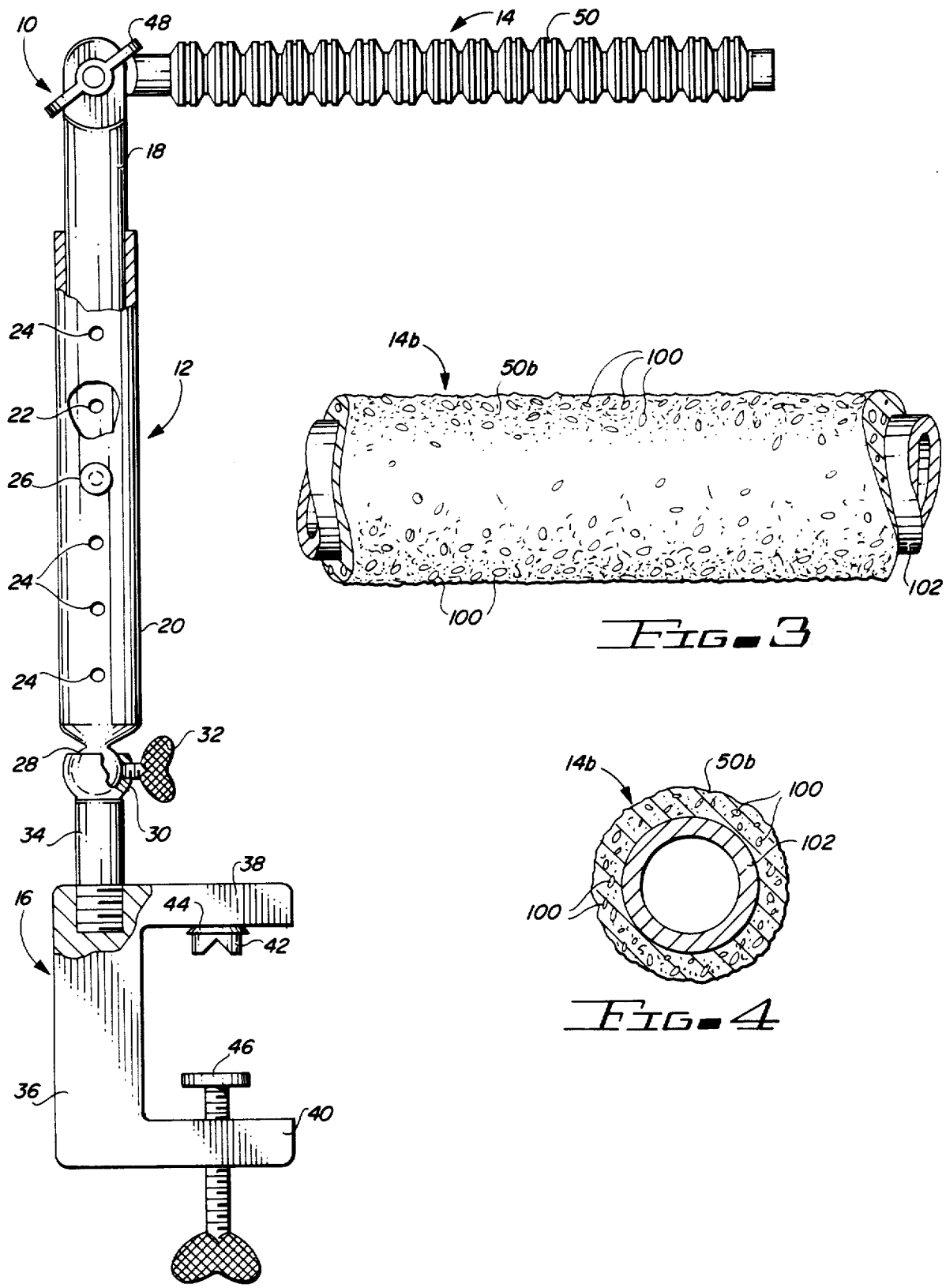

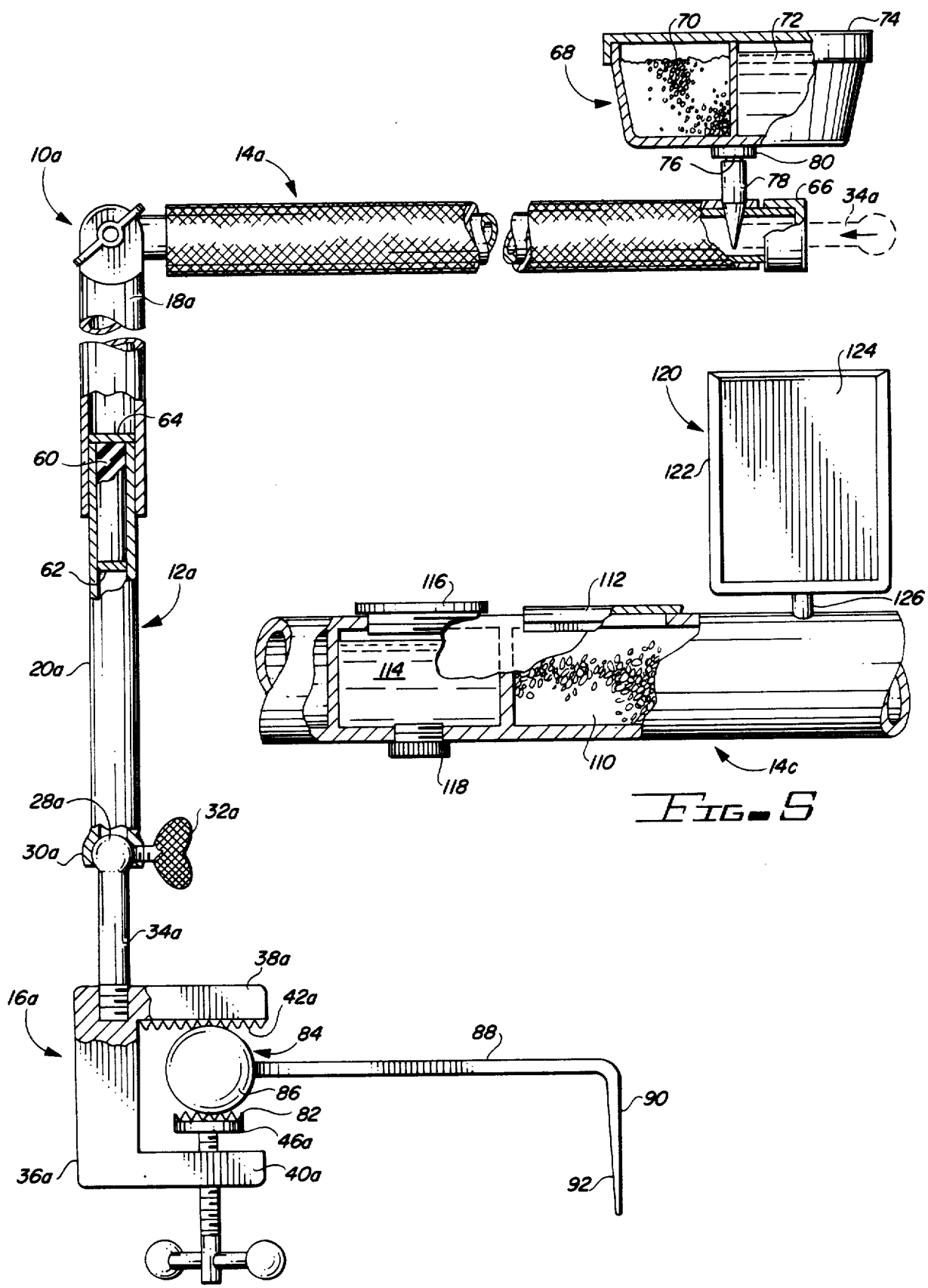

PORTABLE BIRD PERCH ASSEMBLY

BACKGROUND OF THE INVENTION

1. Field of the Invention

The present invention generally relates to bird equipment and, more particularly, to an improved portable bird perch.

2. Prior Art

Bird perches and the like usually are more or less permanently fixed to bird houses, cages, etc. Moreover, they usually consist of single solid, wooden, plastic or metal rods. In some instances, more complicated structures are involved, such as the parrot platform shown in U.S. Pat. No. 3,810,445 and the bird ladder of U.S. Pat. No. 2,690,159. Certain of the perches include amusement devices such as mirrors (see U.S. Pat. No. 2,731,949), or attachments such as bird dropping trays (see U.S. Pat. Nos. 2,731,949; 2,720,188; and 2,717,577). A few others are designed to be detachably secured, as by suction cups, to essentially immobile furniture, wall mirrors and the like (see U.S. Pat. Nos. 2,720,188 and 2,717,577). Still other perches involve the use of special materials such as abrasive nail-filing undersides (U.S. Pat. No. 2,570,663) and corrugated exteriors (U.S. Pat. No. 2,796,043). None are well adapted for releasably mounting to vehicles, such as powered and unpowered golf carts, dune buggies, go carts, etc., and the like.

Birds need and desire new experiences, freedom of movement and changing conditions to maintain their health and interest in life. Care must be taken to stimulate their interests periodically. This could be achieved while allowing them to provide enjoyable companionship for their owners while engaged in outdoor activities, such as golfing, if a suitable portable perch could be devised which would be particularly adapted for attachment to a mobile structure, such as a golf cart, go cart, or the like. Such a perch preferably should include a bird feeder and also shock absorbing components to prevent excess jiggling of the perch. The bird perch should be easily and rapidly detachably mounted on a wide variety of tubular and non-tubular vehicular components and could also be used to support a score card holder or the like. Moreover, it should be easily and compactly stored for transport and be inexpensive and durable.

SUMMARY OF THE INVENTION

The improved bird perch assembly of the present invention satisfies all the foregoing needs. The assembly is substantially as set forth in the Abstract above. Thus, the assembly comprises three major components, an upright support arm, a bird perch arm pivoted thereto adjacent the upper end thereof and an anchoring base, such as a C-clamp connected to the lower end thereof. The perch arm can have a separate removable feeder or integral feeder containing bird seed, grit, water, etc., and a score card holder, etc. The perch arm covering is perferably removable and roughened to permit firm gripping. It may be of wood, plastic, etc., and may be hollow to provide a storage space for feed for the support arm, etc. The support arm can be telescopable and have a universal joint. It can be detachable from the C-clamp to facilitate storage and transport of the assembly and can include shock-absorbing means, as can the base, etc. The C-clamp can have removable teeth and the base can also include a bracket releasably gripped by the clamp. Further features of the invention are set forth in the following description and accompanying drawings.

DRAWINGS

FIG. 1 is a schematic side elevation, partly broken away, of a first preferred embodiment of the improved bird perch assembly of the present invention;

FIG. 2 is a schematic side elevation, partly broken away, of a second preferred embodiment of the improved bird perch assembly of the present invention;

FIG. 3 is an enlarged, fragmentary, schematic side elevation of a third preferred embodiment of the perch arm utilized in the assembly of the present invention;

FIG. 4 is a schematic transverse cross-section of the perch arm of FIG. 3; and,

FIG. 5 is an enlarged, fragmentary, schematic side elevation of a fourth preferred embodiment of the perch arm utilized in the assembly of the present invention.

FIG. 1

Now referring more particularly to FIG. 1 of the accompanying drawings, a first preferred embodiment of the improved bird perch assembly of the present invention is schematically depicted therein. Thus, assembly 10 is shown in side elevation. Assembly 10 includes an upright support arm 12, a horizontal perch arm 14 and an anchoring base 16.

Support arm 12 is generally tubular and comprises a hollow tubular upper portion 18 telescopable within a hollow tubular lower portion 20. Portion 18 is provided with holes 22 vertically spaced alignable with vertically spaced holes 24 in portion 20. A pin 26 can be passed through on set of aligned holes 22 and 24, as shown in FIG. 1, to releasably hold portions 18 and 20 together in a desired telescoped position. Thus, this arrangement is used to adjust the height of arm 12. The lower end of portion 20 terminates in a universal joint which comprises a ball 28 releasably held in a ring 30 by a threaded screw 32 passing through ring 30 into frictional contact with ball 28. Ring 30 is affixed to the top of a spike 34 releasably threadably secured in the top of base 16 which comprises a C-clamp 36. C-clamp has opposed jaws 38 and 40. Jaw 38 bears removable teeth 42 in a fixture 44 opposite a threaded clamp plate 46 disposed through jaw 40. Teeth 42 are left in or removed from clamp 36, depending on the shape and size of the object to which clamp 36 is to be releasably secured, e.g., a tubular frame pipe of a golf cart, or a flat side wall or ledge of such a cart, etc.

Perch arm 14 is pivotally releasably secured to the upper end of portion 18 of support arm 12, as by threaded winged screw 48. Thus perch arm 14 is pivotable between the operative horizontal position shown in FIG. 1 and a vertical stored position generally parallel to support arm 14. Perch arm 14 includes a knurled outer covering 50 which can be detachable from the remainder of arm 14.

If desired, arm 14 can be removed from arm 12 and arm 12 can be collapsed and unscrewed from clamp 36, so that all those components can be easily stored and transported. Thus, assembly 10 is simple, inexpensive, durable and portable, easy to assemble and take down and fully adjustable as to height and position. Perch arm 14 is sturdy, easily gripped by a bird and replaceable, if desired. Assembly 10 can be readily connected to a golf cart, shopping cart, dune buggy, bicycle, etc., to provide an effective mobile bird perch. Arms 12 and 14 and clamp 36 can be fabricated of metal, wood, plastic, ceramic and various combinations thereof and is effective for its intended purposes.

FIG. 2

A second preferred embodiment of the improved bird perch assembly of the present invention is schematically depicted in FIG. 2. Thus, assembly 10a is shown. Components thereof similar to those of assembly 10 bear the same numerals, but are succeeded by the letter "a". Thus, device 10a includes upright support arm 12a, horizontal perch arm 14a pivotally secured to the upper end thereof by screw 48a, and base 16a in the form form of a C-clamp 36a threadably secured to the bottom thereof.

Arm 12a includes upper portion 18a which slides over lower portion 20a to house an internal resilient elastomeric shock absorbing plug 60 therebetween. This plug 60 is seated on a plate 62 in portion 20a and extends up into portion 18a. The upper end of plug 60 strikes the underside of plate 64 in portion 18a, so that portion 18a rides thereon. Vertical oscillation of arm 12a is thus cushioned by plug 60.

A universal joint is provided in arm 12a and comprises a lower portion 34a threaded into clamp 36a and bearing a ball 28a at its upper end. Ball 28a is releasably received in ring 30a connected to the lower end of position 20a and is secured thereto by screw 32a.

Arm 14a is hollow and tubular with a removable end cap 66 to permit storing of a part of item 34a therein, as shown in dotted outline. Covering 50a may be abrasive to provide a non-slip grip and may be removable from arm 14a.

A bird feeder trough 68 divided into a feed bin 70 and a water bin 72 is provided with a removable cover 74 and is releasably secured to perch arm 14a by a rod 76 riding in a base spike 78 removably received in the upper portion of arm 14a. Trough 68 is cushioned by a resilient washer 80 around rod 76 and between trough 68 and spike 78.

Clamp 36a includes resilient teeth 42a on jaw 38a and resilient teeth 82 on plate 46a. These teeth, together with resilient bracket 84 additionally cushion assembly 10 against shocks during movement thereof when attached to a vehicle, etc. Thus, bracket 84 includes resilient components which may be a ball 86 connected to an arm 88 having a horizontal portion 90 and depending spiked portion 92. The latter is adapted to seat in a cart opening or the like, or between a cart frame and golf bag, etc.

Assembly 10a permits perch 14a to ride easily and smoothly on a vehicle, so as not to jostle or dislodge the bird on the perch. The birds comfort is increased due to the presence of trough 68 and its contents. Assembly 10a components can easily be folded and disconnected for storage and transport. Device 10a is simple, efficient and inexpensive.

FIGS. 3 and 4

A third preferred embodiment of the perch arm portion of the present improved assembly is schematically depicted in FIGS. 3 and 4. Thus, a portion of perch 14b is shown which includes a covering 50b which comprises a suitable material such as wood, pressured wood pulp or the like bearing a plurality of feed particles 100, such as seeds and/or gravel, etc., releasably embedded in the surface thereof for use by a bird on perch 14b. Covering 50b is disposed on a hollow tube 102 and is slided therefrom for replacement, as desired. Perch 14b is otherwise identical to perch 14 and can be substituted for perch 14 or perch 14a.

FIG. 5

A fourth preferred embodiment of the perch arm portion of the improved assembly of the present invention is schematically depicted in FIG. 5. Thus, perch arm 14c is shown which is hollow and includes an internal seed bin 110 with hinged top cover 112 and a separate internal water bin 114 with top screw cap 116 and bottom drain plug 118. Perch arm 14c also includes a removable score card holder 120 comprising a frame 122 for holding a card 124, and a bottom post 126 receivable with the top of perch 14c. Perch arm 14c is otherwise similar to perch 14 and can be substituted for perch 14 or perches 14a or 14b.

Further modifications, changes, alterations and additions can be made in the improved bird perch assembly of the present invention, its components and their parameters. All such changes, modifications, alterations and additions as are within the scope of the appended claims form part of the present invention.

What is claimed is:

1. An improved collapsible, portable bird perch assembly, said perch assembly comprising, in combination:
   (a) an upraised support arm;
   (b) anchoring means secured to said arm adjacent the lower end thereof for releasably attaching said perch assembly to different types of substrates; and,
   (c) a bird perch arm secured to the upper end of said upraised supper arm by pivot means for movement between an operative perch position and a compact, collapsed storage position, whereby said assembly is carried from one location to another with said perch arm being collapsed and aligned with said support arm for ease of transport, and whereby said assembly, when at a desired location, is secured by said anchoring means to a substrate and said perch arm is moved about said pivot means to an operative position.

2. The improved assembly of claim 1 wherein said perch arm is elongated and includes an irregular outer covering to facilitate gripping by a birds feet.

3. The improved assembly of claim 2 wherein said covering comprises knurled wood and is slideably removable and replaceable.

4. The improved assembly of claim 2 wherein said covering includes a portion having embedded gravel and/or bird seed.

5. The improved assembly of claim 2 wherein said perch arm includes a game score card holder.

6. The improved assembly of claim 1 wherein said feeder includes a base removable from an opening in said perch arm, and a removable top feeder cover.

7. The improved assembly of claim 1 wherein said anchoring means comprises a C-clamp.

8. The improved assembly of claim 7 wherein said C-clamp includes removable gripping teeth for adaptation of said clamp to tubular and non-tubular substrates.

9. The improved assembly of claim 7 wherein said C-clamp includes resilient gripping teeth.

10. The improved assembly of claim 7 wherein said anchoring means includes a bracket releasably secured by said C-clamp and adapted to fit a golf cart.

11. The improved assembly of claim 10 wherein said bracket is flexible and resilient so as to act as a shock absorber for said assembly.

12. An improved portable bird perch assembly, said perch assembly comprising, in combination:
   (a) an upraised support arm;
   (b) anchoring means secured to said arm adjacent the lower end thereof for releasably attaching said perch assembly to an substrate; and,
   (c) a bird perch arm secured to said upraised support arm for movement between an operative perch position and a collapsed storage position,
   (d) wherein said perch arm is elongated and includes an irregular outer covering to facilitate gripping by a birds feet, and
   (e) wherein said perch arm is hollow, rotatably secured to the upper end of said support arm and includes a removable end cap and storage space for at least a portion of said support arm.

13. An improved portable bird perch assembly, said perch assembly comprising, in combination:
   (a) an upraised support arm;
   (b) anchoring means secured to said arm adjacent the lower end thereof for releasably attaching said perch assembly to a substrate; and,
   (c) a bird perch arm secured to said upraised support arm for movement between an operative perch position and a collapsed storage position,
   (d) wherein said perch arm is elongated and includes an irregular outer covering to facilitate gripping by a birds feet, and
   (e) wherein a feeder is received in said perch arm, and wherein said perch arm is rotatably secured to said support arm for movement between a horizontal perch position and a folded storage position against said support arm.

14. The improved assembly of claim 13 wherein said feeder includes shock absorbing means and is removable from said perch arm.

15. The improved assembly of claim 13 wherein said feeder comprises separate water and feed bins integral with said perch arm.

16. The improved assembly of claim 15 wherein said feeder bins have openable top closures and are disposed within the main body of said perch arm.

17. An improved portable bird perch assembly, said perch assembly comprising, in combination:
   (a) an upraised support arm;
   (b) anchoring means secured to said arm adjacent the lower end thereof for releasably attaching said perch assembly to a substrate; and,
   (c) a bird perch arm secured to said upraised support arm for movement between an operative perch position and a collapsed storage position, and
   (d) wherein said support arm is elongated and is at least one of telescopable and releasably secured to said anchoring means for improved storageability.

18. The improved assembly of claim 17 wherein said support arm includes a universal joint.

19. The improved assembly of claim 17 wherein said support arm includes shock absorbing means.

20. The improved assembly of claim 17 wherein the lower portion of said support arm is detachable therefrom and storable in said perch arm.

* * * * *